Oct. 30, 1956 H. A. ADAMS 2,769,027

COLORED TELEVISION SYSTEM

Filed Jan. 26, 1954 2 Sheets-Sheet 1

HAROLD A. ADAMS
INVENTOR.

BY Jesse P. Whann
ATTORNEY

Oct. 30, 1956 H. A. ADAMS 2,769,027

COLORED TELEVISION SYSTEM

Filed Jan. 26, 1954 2 Sheets-Sheet 2

HAROLD A. ADAMS

INVENTOR.

BY Jesse P. Mhann

ATTORNEY

United States Patent Office 2,769,027

Patented Oct. 30, 1956

2,769,027

COLORED TELEVISION SYSTEM

Harold A. Adams, Isabella, Calif., assignor to Colored Television Co., Fresno County, Calif., a limited copartnership Application January 26, 1954, Serial No. 406,155

7 Claims. (Cl. 178—5.4)

My invention relates to means for producing television, and relates in particular to an attachment which may be incorporated in old television receivers as a replacement or which may be incorporated in new receiving sets as a part of the original equipment.

It is an object of my present invention to provide a means for imparting color to television images so that the television picture which appears on the screen of the receiver will be presented in color.

A further object of the invention is to provide a simple system of color television wherein color value images of an object, such as a scene are broadcast at a frequency corresponding to or having a predetermined relation to the frequency of well known public utility alternating current supply systems, namely, 60 cycles per second in most localities, this system having a television receiver equipped with means operating under control of the alternating current supply to synchronize the addition of color with the production of color-value picture frames in the receiver.

A further object of the invention is to provide for use in a system of the character described in the foregoing, a receiver having means for bringing color filters into operative position and also having simple means for correlating these color filters with corresponding picture images.

It is a further object of the invention to provide an attachment for a television receiver including a television tube wherein the picture images are formed on the screen of the tube, there being optical means for projecting these images on a viewing screen, to enlarged scale, and means for moving color filters into the path of light formed by the lens of the optical system between the screen of the television tube and the viewing screen, with simple means for correlating and synchronizing the positioning of the color filters with the passage of the color value images, or picture frames through the light path established by the focusing lens means described in the foregoing.

A further object of the invention is to provide a simple means for supporting the color filters, a slippage type of driving connection for rotating the filter supporting means, and means for adjusting the component parts of the drive so that synchronization of the filters with corresponding picture images may be readily accomplished, and it is a further object of the invention to control the synchronization of the filters with the corresponding picture images under control of an impulse which forms a part of the broadcast carrier wave accompanying or carrying the video signal received by the electrical network of the television.

A further object of the invention is to provide a simple means whereby the color filters may be removed from the light path of the optical system so that the television may be then used for the so called black and white pictures.

Further objects and advantages of the invention may be brought out in the following part of the specification wherein I have described a simple form of the invention in detail for the purpose of disclosure without, however, intention of limiting the invention which is set forth in the appended claims.

Referring to the accompanying drawings which are for illustrative purposes only:

Figure 1:
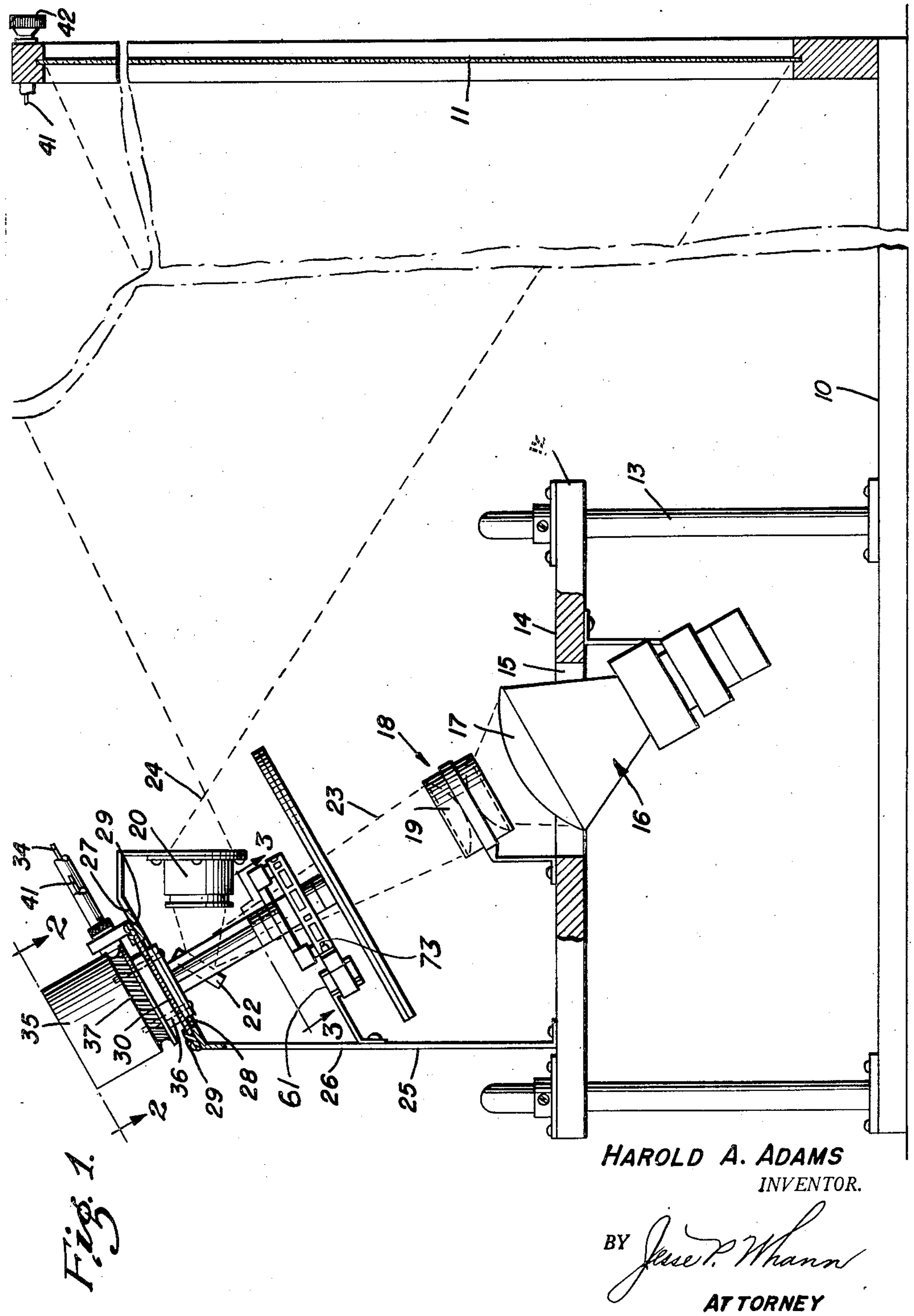
Fig. 1 is a partly sectioned schematic televisional view showing the invention.

Referring to Fig. 1 a base 10 is provided which at the front end thereof supports a viewing screen 11, such as a ground glass. Upon this base 10 there is a support 12 comprising posts 13 and a platform 14 having an opening 15 in which a television receiving tube 16 is mounted in such position that its screen 17 is faced upwardly.

An optical system 18 is arranged so that the image appearing on the screen 17 of the receiving tube 16 will be projected onto the screen 11. This optical system 18 comprises focusing lens means 19 and 20, the lens means 19 being a condensing lens, and the lens means 20 being an objective. The focusing lens means 19 and 20 includes a mirror 22 arranged between the lens 19 and 20 and being adapted to reflect the light which travels through the path 23 so that it will pass through the light path indicated by the dotted lines 24 to the viewing screen 11.

Figure 2:
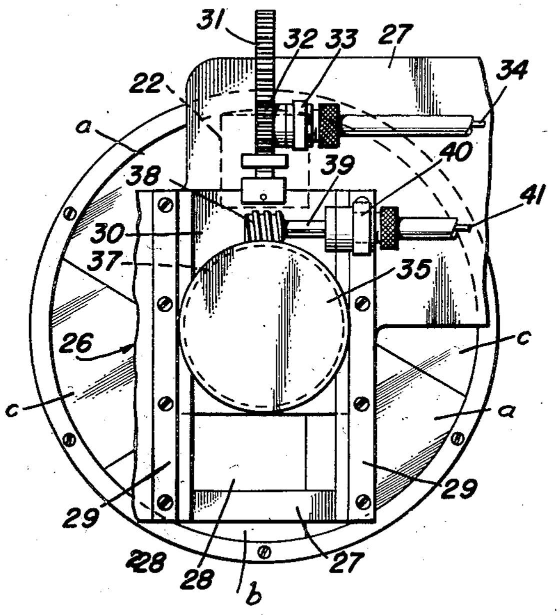
Fig. 2 is an enlarged fragmentary plan view taken as indicated by the line 2—2 of Fig. 1.

On the platform 14 there is a support 25 including a vertical portion 26 and a transverse portion 27 having therein a rectangular opening 28. Along the sides of this opening there are parallel guides 29 which, as shown in Figs. 1 and 2, receive the edges of a carriage 30 which has a rack 31 extending therefrom for engagement by a gear 32 supported in bearing means 33 and arranged to be rotated by a flexible shaft 34. By rotation of the shaft 34 it is possible to shift the carriage 30 from the position in which it is shown at one end of the guides, Fig. 2, to the opposite end thereof.

The carriage 30 also supports a synchronous motor 35 in such position that its axis will be parallel to the optical axis of the condensing lens 18. This motor 35 is mounted on a bearing 36 which is in turn carried by the carriage 30 so that the motor may be rotated bodily on its axis. For this purpose the motor carries a worm gear 37, and a worm 38 is supported by a shaft 39 and bearing means 40 in mesh with the worm gear 37, so that by rotation of the worm, the motor 35 may be bodily rotated. A flexible shaft 41 connects the worm-supporting shaft 39 with a knob 42 arranged on the front wall of the television cabinet.

Figure 3:
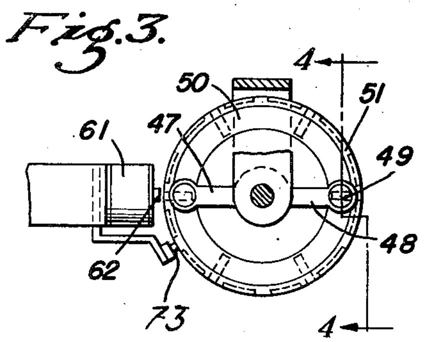
Fig. 3 is a sectional view taken as indicated by the line 3—3 of Fig. 1.
Figure 4:
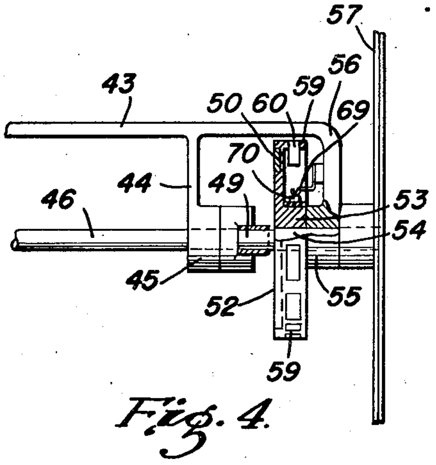
Fig. 4 is a fragmentary sectional view taken as indicated by the line 4—4 of Fig. 3.

As best shown in Fig. 4, a bracket 43 extends downwardly from the carriage 30. This bracket 43 has an arm 44 supporting a bearing 45 arranged to receive the lower end of a shaft 46 which extends downwardly from the motor 35 and is arranged so that its upper end will be driven by the motor 35. As shown in Figs. 1, 3 and 4, a magnetic drive member 47 is mounted on the lower end of the shaft 46 in transverse relation thereto, this magnetic drive member having diametrally extending arms 48 and small permanent magnets 49 secured in the ends thereof with their lower ends positioned so as to confront an iron ring 50 which forms a part of a magnetic driven member 51. The magnetic driven member includes a disk 52 having a hub 53 fixed on the upper end of a shaft 54 which is supported in a vertical bearing 55 carried by the laterally projecting lower end portion 56 of the bracket 43.

A filter holder 57 of circular form is fixed on the lower end of the shaft 54. This filter holder 57 carries one or more complements of color filters. Ordinarily each complement or set of color filters consists of three separate filters in accordance with the extensively employed three color system of color photography. So as to reduce the speed of rotation of the filter holder 57, I prefer to employ several sets of color filters, and accordingly, I have in Fig. 2 shown two sets of color filters, each set consisting of filters *a*, *b* and *c*. When the carriage 30 is positioned in the guides 29 as shown in Fig. 2, the bracket 43 which extends downwardly from the carriage 30 will support the filter holder 57 in such position that a portion of the filter holder 57 will intercept the light path 23 between the focusing lens 19 and the mirror 22. Therefore, rotation of the holder 57 by the motor 35 will cause the color filters *a*, *b* and *c* to consecutively intercept the color value images which are passing through the light path of the focusing lens means 18 in such timed relation thereto that colored component images will appear on the viewing screen 11 in consecutive order and at such frequency that the viewer will see the television motion picture in color. Should the viewer desire to televise an ordinary black and white program, he will, by rotation of the gear 32, apply a force to the rack 31 to move the carriage 30 from the position in which it is shown in Fig. 2, to a position at the opposite ends of the guides 29, thereby moving the filter holder 57 into a position wherein it will lie entirely outside the light path 23, Fig. 1.

The speed of the motor is linked to the frequency of the commercial alternating currents supply, normally 60 cycles, to which the motor is connected. Different supply systems, however, may have a very slight deviation from the true chronological frequency during specified periods of time. The means provided by the invention for compensating for the small differences between the alternating current supply system which controls the transmitter and that which controls the receiver, consists of the simple magnetic synchronizing means described in the following. As shown in Fig. 4, the disk 52 has a circular flange 59 which supports a plurality of small iron bodies 60 in equally spaced relation and corresponding in number to the number of color filters supported by the holder 57. In the present instant there are six of these iron bodies mounted in the peripheral flange 59 of the disk 52. Adjacent the outer surface of the flange 59, as shown in Figs. 1 and 3, an electromagnet 61 is mounted, this electromagnet 61 being positioned so that its core 62 or magnetic axis lies adjacent the circular path followed by the outer ends of the iron bodies 60. The electromagnet 61 is arranged to be periodically energized in timed relation to the occurrence of the color value television images producing magnetic impulses which, if the color filters are out of synchronism with the occurrence with the color value television pictures, will exert forces upon the iron bodies 60 to move the disc 92 slightly forwardly or rearwardly, as the case may be, to bring the disk 52 and the filter support 57 which is attached thereto back into a position wherein the filters *a*, *b* and *c* will be in synchronism with the color value images passing through the optical system 18. One of the control impulses of the receive television signal is employed to control the energization of the electromagnet 61. I find it preferable to use the synchronizing signal known as the "blanking" signal which occurs between each consecutive picture. Therefore, this blanking signal not only blanks the television screen between pictures, but also energizes the synchronizing electromagnets 61.

Figure 5:
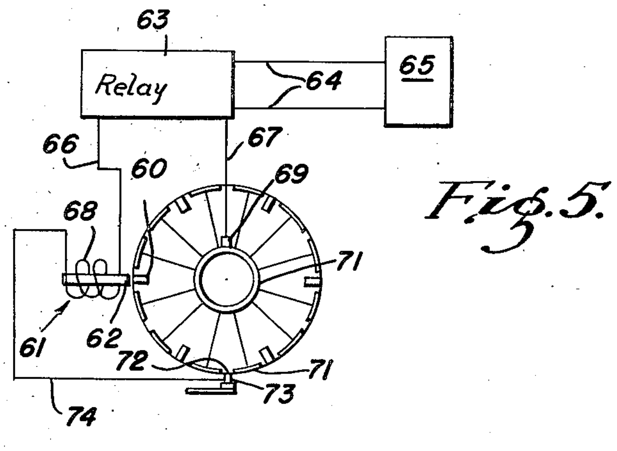
Fig. 5 is an electrical diagram corresponding to Fig. 4.

As shown in Fig. 5 a relay or amplifier 63 is provided having conductors 64 connected to the television receiving network 65 so as to receive the blanking signal therefrom. The higher voltage output of the relay or amplifier 63 is carried through conductors 66 and 67, the conductor 66 being connected to one end of the winding 68 of the electromagnet 61, and the conductor 67 being connected to a brush 69, which, as shown in Fig. 4, is arranged to contact a collector ring 70 mounted on the hub 53 of the member 52.

The member 52 has a commutator consisting of pairs of small plates 71 mounted in the flange 59 of the disk 52 between the positions of the iron bodies 60, there being a gap 72 between each pair of contact plates 71. A brush 73, which is connected by a conductor 74 to the opposite end of the winding 68 engages the outer face of the flange 59 in such position that when an iron body 60 is aligned with the core 62 of the electromagnet 61, the brush 73 will be aligned with a gap 72 between two of the commutator contact plates 71. Accordingly, the circuit which includes the winding 68 of the electromagnet 61 will be open at the brush 73 when the beginnings or front edges of the filters *a*, *b* and *c* are synchronized with the blanking signals referred to in the foregoing. However, should the shoulder holder 57 rotate either forwardly or rearwardly into a position of non-synchronization, the brush 73 will be engaged by one of the commutator contacts 71 and, when a synchronizing impulse is applied to the conductor 66 and 67 it may pass through the winding 68 owing to the fact that the synchronizing circuit is closed at the brush 73. The magnetism produced by this momentary energization of the winding 58 will exert a force on the adjacent iron body which will tend to pull such iron body into alignment with the core 62 to effect restoration of synchronization of the filters with the color value of pictures being received. It should be understood, however, that the filters *a*, *b* and *c* are of such circular dimension that a degree of a small departure from synchronization may occur, without interference with the picture reproduction on the viewing screen 11. Such departure from synchronization will be corrected or tipped within bounds by the arrangement described with relation to Fig. 5.

The filter holder 57 and the disk 52 are made of extremely lightweight material, and after a very short period of operation of the motor 35 the action of the magnetic drive comprising the permanent 49 and the iron ring 50 causes the parts 52 and 57 to rotate at the same speed as the arms 48 in a manner similar to that which would be effected if the arms 48 were physically connected to the disk 52. Accordingly, by bodily rotating the motor around its axis, through rotation of the worm 38, the filter holder 57 may be rotated independently of the motor speed. That is to say, the filter holder 57 may be advanced or retarded from its normal rotation so that a different color filter may be shifted into the light path 23 to bring the color filters into correlation with the color value images being received by the receiving set. If an orange-red filter is positioned in the light path 23 during the passage of a blue-green color value image therethrough, rotation of the motor 35 bodily may be employed to effect a rotation of the filter holder 57 independently of the rotation thereof by the motor shaft 46 to shift the unwanted filter out of the light path 23 and shift the desired filter into the light path 23.

I claim:

1. In a color reproducing means for a television receiver having a receiving tube and a network to receive television signals for energizing and controlling the operation of said tube: focusing means arranged adjacent the screen of said receiving tube so that its object will be said screen; a complement of color filters; a holder for said color filters rotatably supported so that it will carry said filters consecutively across the optical path of said lens means; driving means comprising a motor adapted to be connected to a public utility alternating electrical service and a magnetic driving connection with said holder whereby it may rotate the same; means supporting said driving means so that it may rotate around the axis of said driving connection, thereby making it possible to rotate said holder independently of said motor so as to correlate said filters with corresponding picture; and means operated by one of the television signals for applying a force to said holder independently of the motor so as to synchronize said filters with the corresponding picture frames.

2. A color reproducing means as defined in claim 1, having in addition thereto means controlling by the blanking impulse of the video signal to apply a force to said holder so as to synchronize the beginning of each of said color filters with each corresponding picture frame.

3. In a color reproducing means for a television receiver having a receiving tube and a network to receive television signals for energizing and controlling the operation of said tube: focusing means arranged adjacent the screen of said receiving tube so that its object will be said screen; a complement of color filters; a holder for said color filters rotatably supported so that it will carry said filters consecutively across the optical path of said lens means; driving means comprising a motor adapted to be connected to a public utility alternating electrical service; a slippable drive connection between said motor and said holder for imparting rotation to said holder at a velocity which will cause said filters to move across said optical path in timed relation to said picture frames; means operated under control of one of the normal television signals for applying a force to said holder to synchronize said color filters with corresponding picture frames; and means supporting said driving means so that it may rotate around the axis of said driving connection, thereby making it possible to rotate said holder independently of said motor so as to correlate said filters with corresponding picture frames.

4. A color reproducing means as defined in claim 3 having a rotatable member connected to said holder so as to rotate therewith, said rotatable member being divided into segments corresponding to said filters, and magnetic means comprising a coil part and an armature part, one of said parts being mounted on said rotatable member in a predetermined relation to one of said segments and the others of said parts being mounted adjacent said rotatable member, and means for energizing said coil part in timed relation to the production of picture frames in the television broadcast, whereby magnetic attraction between said coil part and said armature part will exert a force tending to align said parts.

5. A color reproducing means as defined in claim 3 having means for energizing said coil part which consists of elements arranged to utilize the blanking signal of the broadcast carrier wave for the control of the periodic energization of said coil part.

6. A color reproducing means as defined in claim 3 wherein said means for energizing said coil part comprises a control circuit and has a commutator rotating with said holder and being arranged to open said control circuit when said coil part and said armature part are aligned, so that said coil part cannot be energized at that time.

7. In a color reproducing means as defined in claim 5 having a control circuit through which said coil part is energized, with switch means in said control circuit and switch means controlled by said rotatable member adapted to open said control circuit when said filters are in synchronism with said picture frames.

References Cited in the file of this patent

UNITED STATES PATENTS

| | | |
|---|---|---|
| 2,466,021 | Boldmark | Apr. 5, 1949 |
| 2,645,678 | Christensen | July 14, 1953 |
| 2,662,111 | Poliakoff | Dec. 8, 1953 |